Dec. 26, 1922.
H. S. HUBBELL.
MICROMETER.
FILED JULY 23, 1921.
1,440,080
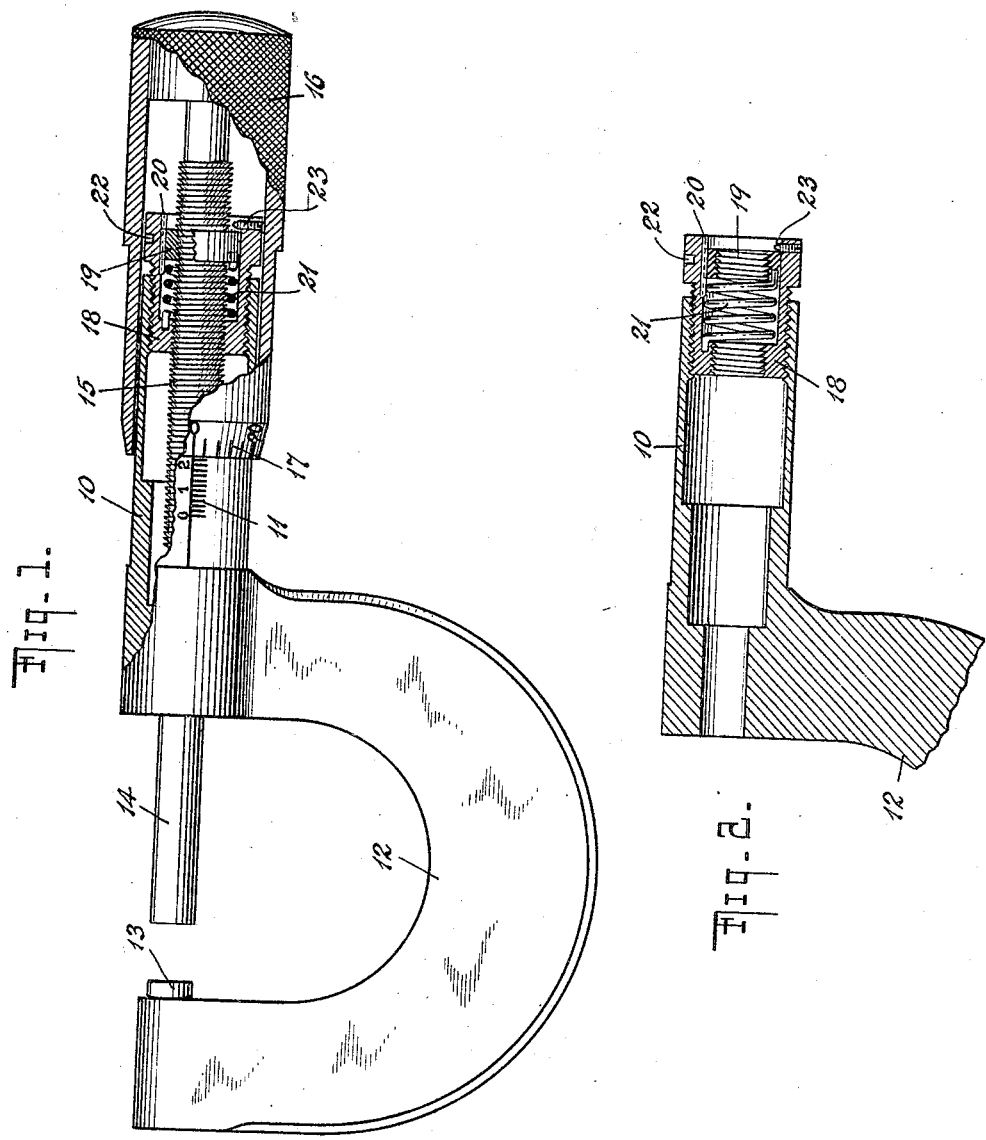
WITNESS:
G. V. Rasmussen
INVENTOR
HENRY S. HUBBELL
BY
Bieser & Schrenk
ATTORNEYS Patented Dec. 26, 1922.

1,440,080

UNITED STATES PATENT OFFICE.

HENRY S. HUBBELL, OF ASHBURNHAM, MASSACHUSETTS, ASSIGNOR TO T. R. ALMOND MANUFACTURING COMPANY, OF ASHBURNHAM, MASSACHUSETTS, A CORPORATION OF NEW YORK.

MICROMETER.

Application filed July 23, 1921. Serial No. 486,995.

*To all whom it may concern:*

Be it known that I, HENRY S. HUBBELL, a citizen of the United States, and resident of Ashburnham, county of Worcester, and State of Massachusetts, have invented certain new and useful Improvements in Micrometers, of which the following is a specification.

My invention relates to micrometers, and has for its object to prevent loss and disarrangement of certain parts which are liable to become separated from the instrument upon dismembering the same when such instrument is of the usual construction.
In order to accomplish this purpose, I have provided retaining means of special arrangement relatively to the other parts of the micrometer to hold certain elements against loss when the instrument is taken apart, and also to facilitate the proper reassembling of the instrument.

A satisfactory and preferred embodiment of my invention is shown in the accompanying drawings, in which Figure 1 is a longitudinal section through one form of my invention and Fig. 2 is a longitudinal section of certain parts in the position they take when the instrument is dismembered.

The micrometer illustrated is of a well known type comprising a tubular handle 10 provided with a longitudinal graduation 11 and a U-shaped head 12 carrying the stationary measuring lug or pin 13 which faces the adjustable measuring rod 14 movable toward and from said pin 13 in a direction parallel to the graduation 11. The rod 14 has a screw-threaded portion 15 and is connected rigidly with a knurled barrel 16 fitted to turn on the outside of the handle 10 and having a scale 17 co-operating with the graduation 11. The threaded portion 15 is in engagement with internal threads of a sleeve or housing 18 and of a nut 19 contained in said housing. A longitudinal key 20 on the housing keeps the nut from turning relatively to the housing while permitting the nut to slide lengthwise in the housing. The nut is under the influence of a spring 21 coiled around the threaded portion 15 within the housing and pressing the nut outwardly, thus tending to separate the measuring faces and to keep the threads of the rod in firm engagement with the internal threads of the housing 18 so as to take up automatically any backlash caused by wear. Generally, a buttress or ratchet thread, with flat sides facing toward the closed outer end of the barrel 16, is employed for the portion 15. The pressure of the spring 21, which bears on the housing 18 and on the nut 19, also produces an increased friction between the threads of the portion 15 on one hand, and the internal threads of the housing 18 and nut 19 on the other hand, thereby preventing the knurled barrel 16 from turning too freely.

The housing 18 has an external thread fitted to a corresponding internal thread in the tubular handle 10, these threads being of a different pitch from those of the threaded portion 15. By turning the housing 18, as by means of a spanner inserted into the hole 22 (after screwing out the barrel 16 sufficiently to expose the spanner hole 22) the housing 18 may be adjusted lengthwise so as to alter the relative position of the scale 17 and graduation 11 to adjust the measuring surfaces or ends to zero or to compensate for their wear.

If only the parts so far described are provided and an inexperienced person unscrews the rod 14, 15 (by turning the barrel 16) from the housing 18, the spring 21 will, as soon as the threads of the rod and of the housing are disengaged, thrust or shoot the nut 19, together with the rod 14, 15 and the barrel 16 from the housing and from the handle 10, the parts thus suddenly and unexpectedly projected generally falling to the floor and the spring 21 itself jumping out of the housing 18 and likewise falling on the floor. A tedious search for the spring usually follows, and before the instrument can be reassembled, the nut 19, which is very hard of access owing to its location deep within the barrel 16, must be unscrewed off or out along the threaded portion 15, this being a most difficult and patience-trying task.

According to my present invention, these drawbacks are avoided by providing on the housing 18, preferably adjacent to the nut 19, retaining means which will prevent separation of said nut and of the spring 21 from the housing 18 when the threaded portion 15 is disengaged from the internal threads of the housing. As illustrated in Figs. 1 and 2, a stop pin or screw 23 is placed in the housing 18 in such a manner as to project into the path of the nut 19 exteriorly of said nut. When the screw rod 14, 15 is removed, the spring 21 will, of course, press the nut 19 against the stop pin or screw 23, as shown in Fig. 2, said stop preventing the nut and the spring from leaving the housing 18. Obviously, in the normal operative position shown in Fig. 1, the nut 19 should not bear against the stop 23 since this would prevent the pressure of the spring on the nut from being transmitted by the rod to the internal threads of the housing 18, which pressure is relied upon to prevent backlash, as explained above. In order to insure that, normally, the nut 19 shall not bear against the stop 23 but shall be free to move outwardly under the influence of the spring 21 until the threads of the rod portion 15 are in firm engagement with the internal threads of the housing 18, as described, the keyway in the nut 19 (for the key 20) is so placed that the said nut is out of pitch (say, one half-turn) with the internal thread of the housing at the time the nut engages the stop 23. In the particular example assumed, wear equal to one-half the pitch of the screw on the threaded portion 15 must take place before the spring 21 will cause the nut 19 to shift outwardly into contact with the stop 23 in the assembled condition of the instrument.

To understand the peculiar relation obtained by having the thread of the nut 19 out of pitch with the internal thread of the housing 18, let us consider the assembling operation, starting with the parts in the dismembered position with the nut 19 against the stop 23, as in Fig. 2. The rod 14, 15 is inserted and screwed into the nut 19 until the unthreaded portion 14 passes through the housing 18. When the first thread of the screw-threaded portion 15 comes in contact with the internal threads of the housing 18, the threads of the rod will not enter those of the housing because the nut 19, being still held against the stop 23 by the spring 21, is out of pitch with the internal threads of said housing. If, then, the screw is backed to an extent corresponding to said difference in pitch (one half-turn in the example assumed) and then pushed forward without turning, together with the nut 19, the threads on the rod portion 15 will be in position to enter the internal threads of the housing 18 since the nut 19, being now separated from the stop 23, as in Fig. 1, will have its threads in pitch with the internal threads of the said housing. In actual practice it has been found that the procedure just described is perfectly natural and easily followed in assembling the instrument.

While the ends of the spring 21 may be simply in loose engagement with the nut 19 and with a shoulder on the housing 18 respectively, I prefer to connect the ends of the spring with the nut and housing, respectively, in such a way as to prevent rotation of the spring ends relatively to the said nut and housing, respectively. The reason for this preferred arrangement is as follows:

In fitting the key and keyway 20 so that the nut 19 is perfectly free to move longitudinally there is produced a certain, though small, amount of backlash in a circumferential direction. This rotary backlash has no effect whatever on the accurate reading of the instrument, but in revolving the barrel 16 back and forth between the thumb and finger it is felt and is considered objectionable.

To obviate this the ends of the spring are bent out or formed as shown and inserted into holes drilled in the housing 18 and in the nut 19. When assembling the nut 19 and spring 21 into the housing 18 the nut 19 is turned a revolution or part of a revolution, whatever is necessary, winding up the spring and causing a tension which tends to rotate the nut 19 and thus taking up the backlash between the key and keyway 20 so that it can no longer be felt when the barrel 16 is rotated back and forth. The spring 21 is thus made to perform two functions.

Various modifications may be made without departing from the nature of my invention as defined in the appended claims.

I claim:

1. A micrometer comprising a stationary part having a housing with an internal screw-thread, a movable part having a threaded portion in engagement with said thread of the housing, a nut located in said housing and fitted on said threaded portion but held against rotation relatively to the housing while permitted to slide lengthwise thereof, a stop on the housing for limiting the outward movement of said nut, said stop being so located that when the nut is in engagement therewith, the threads of the nut are out of pitch with the internal threads of the housing, and a coiled spring located within the housing and bearing against the nut and against the housing to press the nut toward said stop.

2. A micrometer comprising a stationary part having a housing with an internal screw-thread, a movable part having a threaded portion in engagement with said thread of the housing, a stop on the outer portion of the housing, a nut mounted in the housing to slide lengthwise thereof but held against rotation relatively to the housing, said nut being placed interiorly of said stop and fitted on said threaded portion, the threads of the nut being out of pitch with those of the housing when the nut is in engagement with said stop, and a spring for urging the nut toward said stop.

3. A micrometer comprising a stationary part having a housing with an internal screw-thread, a movable part having a threaded portion in engagement with said thread of the housing, a nut mounted in the housing to slide lengthwise thereof but held against rotation relatively to the housing, said nut being fitted on said threaded portion, stop means for arresting the outward movement of the nut at a point where the threads of the nut are out of pitch with those of the housing, and a spring urging the nut outwardly.

4. A micrometer comprising a stationary part having a housing with an internal screw-thread, a movable part having a threaded portion in engagement with said thread of the housing, a nut mounted in the housing to slide lengthwise thereof but held against rotation relatively to the housing, said nut being fitted on said threaded portion, a spring tending to force the said nut outwardly, and retaining means for preventing separation of the nut and the spring from the housing when the threaded portion of the movable part is withdrawn from the housing.

5. A micrometer comprising a stationary part having a housing with an internal screw-thread, a movable part having a threaded portion in engagement with said thread of the housing, a nut fitted on said threaded portion and held against turning relatively to the housing, yet permitted to slide lengthwise thereof, and retaining means to prevent separation of the nut from the housing when the threaded portion of the movable part is withdrawn from the housing.

6. A micrometer comprising a stationary part having a housing with an internal screw-thread, a movable part having a threaded portion in engagement with said thread of the housing, a nut fitted on said threaded portion and held against turning relatively to the housing, yet permitted to slide lengthwise thereof, and a spring under torsional tension having its ends pressing said nut and housing circumferentially in opposite directions and also tending to force them apart longitudinally.

In testimony whereof I have hereunto set my hand.

HENRY S. HUBBELL.